July 29, 1969  R. R. COLLINS ET AL  3,458,015
SHOPPING CART BRAKE SYSTEM
Filed Sept. 1, 1967  2 Sheets-Sheet 1
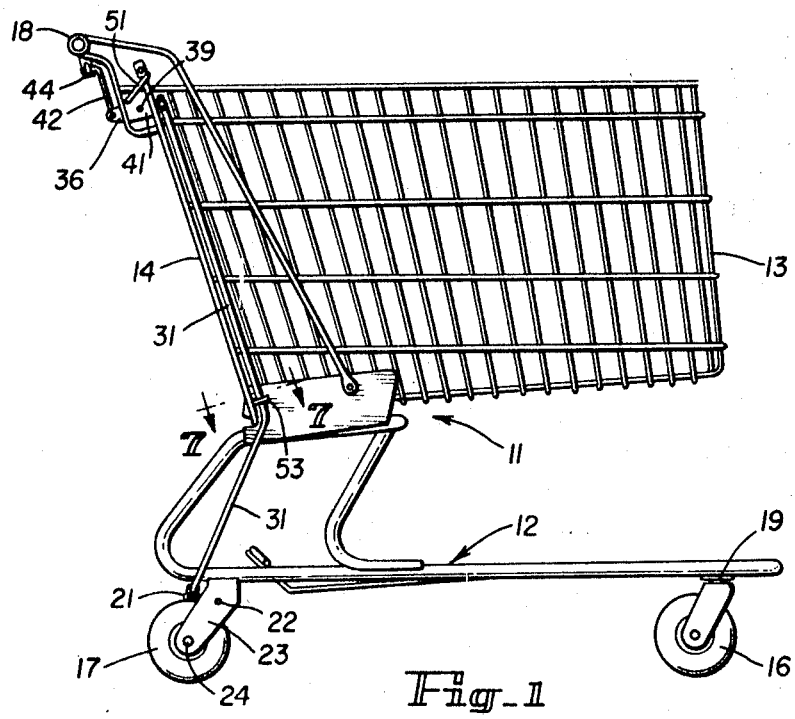
Fig_1
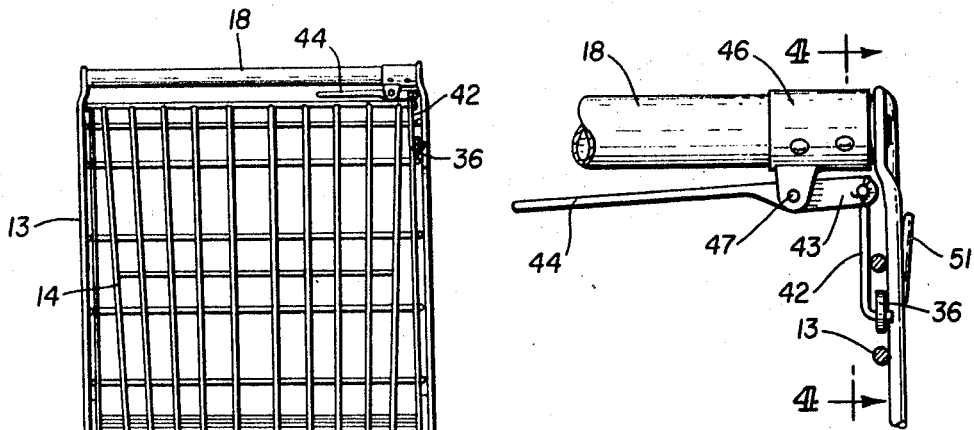
Fig_2
Fig_3
INVENTORS.
ROY R. COLLINS
SERENO R. TAIT
BY
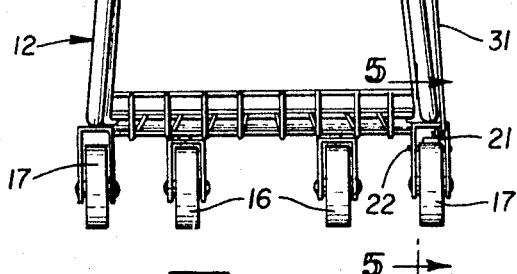
ATTORNEY July 29, 1969   R. R. COLLINS ET AL   3,458,015
SHOPPING CART BRAKE SYSTEM
Filed Sept. 1, 1967   2 Sheets-Sheet 2

INVENTORS.
ROY R. COLLINS
SERENO R. TAIT
BY
ATTORNEY

United States Patent Office 3,458,015
Patented July 29, 1969

3,458,015
SHOPPING CART BRAKE SYSTEM
Roy R. Collins, 6695 W. 25th Ave. Lane, Lakewood, Colo. 80215, and Sereno R. Tait, 2401 Ames St., Edgewater, Colo. 80214
Filed Sept. 1, 1967, Ser. No. 664,992
Int. Cl. B60t 1/00
U.S. Cl. 188—29                    6 Claims

ABSTRACT OF THE DISCLOSURE

A braking attachment for shopping carts which utilizes a spring and control rod actuated brake shoe normally urged by said spring toward a position of engagement against a wheel of said cart with an operator control lever connected to said control rod and disposed adjacent to the handle of said cart for disengaging said brake when the cart is to be moved, and a release lock for holding said brake in a released position or for forced, cam assisted movement to accomplish auxiliary release and holding of said brake as desired. All of said components inclusive of a push rod interconnecting said operator lever and the release lock and brake shoe itself are disposed in out of the way and non-interfering position so that the shopping carts may be nested one within the other with the brakes still applied or released as desired. With proper manipulation of the operator lever the brake can be selectively or partially applied for slowing a cart.

Background of the invention

Previously, inventors have recognized the need for a braking system on the telescoping type shopping carts now in widespread use. Some earlier inventors have provided sophisticated systems for the automatic release of the brakes when shopping carts are disposed in a nested position. Accordingly, the overall problems concerned with the use of shopping carts in stores and outside on parking ramps has been previously recognized even though such earlier shopping cart braking systems have not been widely introduced to users and market owners. The present invention is intended to present further developments and improvement in the overall field to provide shopping carts having added control features and utility.

Summary of the invention

The present invention provides a braking system for shopping carts. A brake shoe is pivotally mounted adjacent to a wheel of the shopping cart and is urged by a spring toward engaging contact with the wheel. The spring is of such strength as to efficiently hold and lock the wheel in position. A control linkage system extends from the brake shoe to an operator control lever disposed close to the handle for the shopping cart to provide a primary control system for the brake that is easily manipulated by a cart user. When the operator lever is gripped, the brake will be released; and when the cart is unattended, the brake normally will be applied. A release lock mechanism is utilized, however, so that the brake can be moved to and held in the released position by manipulation of a locking lever, which further provides a complete auxiliary or secondary system for the release or actuation of said brake. Primary and overriding control is still maintained by the operator control lever. The primary control lever can be used to partially engage the brake so that the movement of the cart can be slowed as well as abruptly stopped. Through the use of the present systems, brake control of any or all of the carts in a nested stack is still possible. The brake system may be applied to one or more wheels of the cart, if desired.

A prime objective of the invention is to provide complete braking control for any individual shopping cart at all times when the cart is being used or is at rest.

A further object is to provide primary and secondary controls which may be alternately or cooperatively used to improve the utility of shopping carts incorporating the invention.

Further objects and advantages of the present invention will be apparent from the appended description and drawings.

Brief description of the drawings

FIG. 1 is a side elevation of a shopping cart utilizing the present braking system, FIG. 2 is a rear elevation of the cart shown in FIG. 1, FIG. 3 is an enlarge detail illustrating features of the operator control handle and associated parts.

Description of the preferred embodiment

Figure 4:
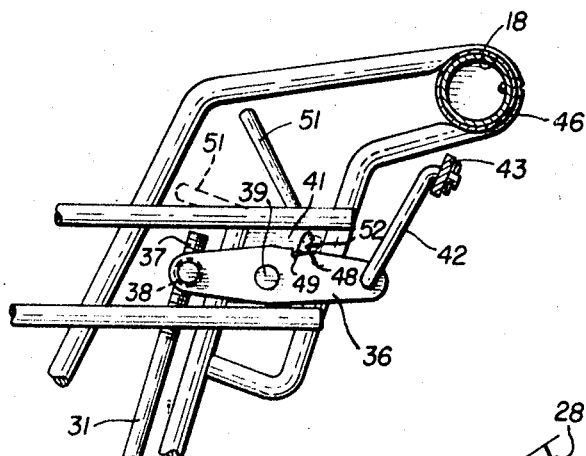
FIG. 4 is a cross-sectional elevation taken along the line 4—4 of FIG. 3.

FIGS. 1 and 2 show the general configuration of a nesting type of shopping cart 11 having a base frame 12, a carrier basket 13 that is closed by a swinging end gate gate 14, and that is supported by front and rear wheels 16 and 17. The frame, basket, wheels and end gate are all formed in conventional manner so that one shopping cart may be ested within another when the baskets are empty and out of use. When the carts are in use, the user normally holds and pushes against the cart handle 18 to guide and steer the shopping cart through the aisles of a store or across a parking lot. Front or rear wheels are usually caster mounted to facilitate steering, and for ease of handling the bearings for all the wheels are of a design to assure ease of movement of the cart when it is empty or loaded. This ease of movement can cause some serious problems. When the shopping carts are used on a parking lot that might be even slightly inclined, the cart can often tend to escape the user while attention is diverted to the tasks of opening doors, unloading the cart, etc. When the carts are left unattended, they often can move voluntarily to run into other carts, customer cars, down embankments or into interfering positions of placement.

Others have previously recognized the fact that it would be advantageous to provide brakes on shopping carts of this type to avoid such troubles. The present inventors believe that a proper braking system can present additional advantages for shopping carts when used inside the stores or at locations where the carts are used along inclined ramps or parking areas.

In accordance with the present concept and invention, it is considered to be desirable to provide a brake system that is normally engaged and that must be purposefully released by the operator-user or by store personnel. It is further recognized that it is desirable to provide a mechanism for selectively releasing the brake and for holding the brake released. It is a further concept that the brake system should be of a design which can be partially engaged to slow a cart that is being used on inclined ramps or a system that can be manipulated to gradually stop a shopping cart as distinguished from brakes that are abruptly applied that might cause damage to or the overturning of a cart due to such abrupt brake applications.

Features which would additionally provide a different braking force or action dependent upon the direction of movement of the shopping cart could be of further utility, since an identical braking force that efficiently stops a cart moving in the forward direction might be excessive and cause overturning of a loaded cart moving in reverse direction. In addition to providing a mechanism for the primary control of the braking system, it has also been thought desirable to provide a secondary or auxiliary control that can be used to release the brakes and that will be positioned for easier access when the shopping carts are in the stacked relation. Preferred embodiments of the invention could for the purposes of economy of construction and efficiency use elements of the primary and auxiliary braking systems cooperatively.

A preferred embodiment of the invention could incorporate some or all of the above listed features and advantages. The embodiment shown in the attached drawings provides a brake attachment that is readily adapted to the type of shopping cart shown or that may be similarly adapted for installation on shopping carts of different configuration. Certain features of the present braking system further facilitate the application of the brake units to shopping carts that are already in service or make it easy to incorporate such units at the time of initial manufacture.

In the preferred embodiment of the invention the brake system is shown as being applied to a single rear wheel. Actually the brake units could be applied to a pair of wheels, but for most uses it is believed that brake control of a single wheel will be adequate. It is preferable to mount the brakes at a rear wheel 17, since the front wheels 16 are mounted on full swivel casters 19. The front wheels are also disposed inwardly to facilitate the nesting of the shopping carts 11, and the application of brake controls to such wheels would be more complicated.

Figure 5:
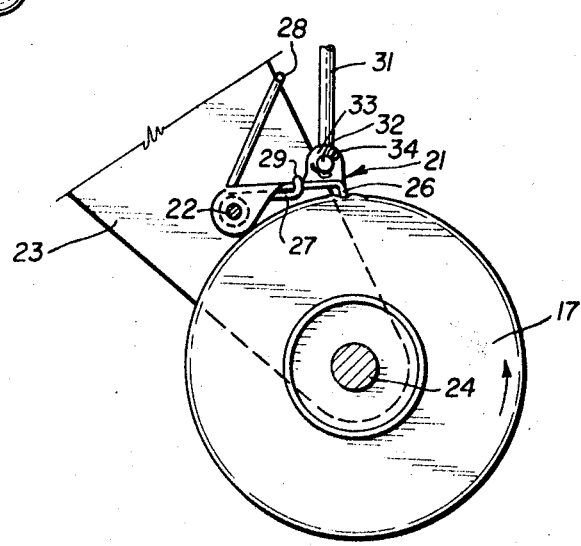
FIG. 5 is a cross-sectional elevation taken along the line 5—5 of FIG. 2.
Figure 6:
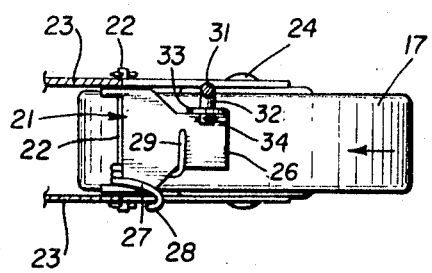
FIG. 6 is a top view of a brake shoe as shown in FIG. 5.

In keeping with the invention the brake shoe 21, as best shown in FIGS. 5 and 6, is mounted for pivotal rotation about a pivot 22 extending between the side forks 23 of the mount for rear wheel 17. The length of the brake shoe 21, the center distance between the pivot 22 and the wheel axle 24, and the relative disposition of such elements is regulated so that a wear lip 26 of the brake shoe 21 will be disposed for engagement with the exterior surface of the wheel 17 at a near tangential position. A brake spring 27 is disposed about the pivot 22 and has its opposite ends 28 and 29, respectively, anchored against a side fork 23 and the pivoted brake shoe 21. The spring is coiled to urge the brake shoe 21 and its wear lip 26 into engagement with the wheel 17. The engagement force exerted by the spring is adequate to stop rotational movement of the wheels 17 irrespective of the direction of rotation of such wheel. When the cart and wheel are moved in a forward direction as indicated by the arrows, an increased braking force will result, since the wheel is rotating toward the brake shoe and its pivot instead of away therefrom.

The described cooperative positioning, accordingly, provides a different braking action dependent on the direction of movement for the cart 11. When the cart is moving in a forward direction, a substantial braking force will be exerted to safely stop the cart. If the cart is moved in a reverse direction, a lesser braking force is exerted when the brakes are applied. This feature prevents the carts from upsetting when the brakes are abruptly applied to a rearwardly moving and, accordingly, less stable cart. The strength of the spring 27 will be selected to obtain efficient braking for forward or reverse movements of the cart. Usually the brake force exerted would be sufficient to cause a slight deformation of the wheel 17 at the point of contact.

Brake control systems are provided to regulate the application and release of the brake shoes 21. A control rod 31 is provided with a bent end 32 which extends through a leg 33 of the brake shoe structure 21. A cotter pin 34 may be provided to hold such elements in their assembled relation. For the embodiment shown the control rod 31 extends from the brake shoe 21 to a pivotally mounted rocker arm 36. The upper end of the control rod 31 is provided with an adjusting thread 37 so that changes in the effective length of the control rod 31 can be made. The threads 37 are engaged by an internally threaded adjusting pin 38 which further provides for pivotal movement with respect to the rocker arm 36 and control rod 31. The entire rocker arm 36 is pivotally movable about a fulcrum shaft 39, which is mounted in fixed position with respect to the shopping cart, since it is supported by a plate 41 welded or otherwise attached to elements of the shopping cart basket 13. The opposite end of the rocker arm 36 is engaged by a push rod 42 which extends upwardly and is connected to the output end 43 of an operator control lever 44. The control lever 44 is disposed beneath the shopping cart handle 18 and is supported in such position by a pivot bracket 46 mounted on the handle 18 and providing support for a through pin 47. The lever 44 is, accordingly, disposed in convenient position to be grasped by the user of the shopping cart and to be moved upwardly as the user's grip is exerted. Upward movement of the lever 44 will cause a corresponding downward movement of the push rod 42 and an upward retraction of the control rod 31 to release the spring actuated brake 21. As long as the cart user grips the lever 44 the brake will be released and the cart can be moved freely, as desired. When the user releases the lever 44, the brake will be automatically set, and the cart will be stopped and held in position.

The described components constitute a first or primary brake control system that can by itself provide benefits and utility for users and owners of shopping carts. This type of brake control can be useful inside a store as well as out, since the carts can be left or stacked or retained in non-interfering positions. A cart having a child passenger could be parked and kept away from shelves and floor displays.

It is recognized, however, that for some uses it would be desirable to be able to hold the brake in the released position. A novel release-lock which can also be used as a second or auxiliary brake control system is provided for this purpose as shown in FIG. 4. The upper surface of the rocker arm 36 is provided with a cam segment 48 which terminates in a catch 49. A release crank element 51 extends through the plate 41, and a follower-latch end 52 is disposed for engagement with the cam and catch 48–49. When the brake has been released by operation of the lever 44, the crank 51 can be rotated upwardly to bring the latch end 52 into engagement with the catch 49. This engagement will hold the brake released. Thereafter when it is desired to release the brake, the lever 44 may again be squeezed, and the weight of the crank 51 will cause reverse rotation of the latch end 52 as the crank falls by reason of gravity forces. Upon subsequent release of the lever 44 the brake will again be applied. These functions of the described components make it possible to hold the brake in disengaged relationship, and in effect constitute a lock system for use with the primary braking system components. A lever 44 which represents the primary brake control, however, provides an overriding control, since the lock functions can be released by action of the primary lever 44.

The same components which provide the described locking feature can be used as a second or auxiliary brake control. With proper sizing and design of the cam 48 and the latch-follower 52 and of the respective lengths of the crank 51 and follower 52, a system can be derived where the brakes 21 can be released by forced upward movement of the crank 51. In FIG. 4 it can be seen that as the crank 51 is rotated in the clockwise direction, the follower 52 will be brought into contact with the cam surface 48. This engagement will cause clockwise rotatiton of the rocker arm 36 and disengagement of the brake 21. This brake releasing rotation of the crank 51 can be continued until the latch-follower 52 is engaged in the catch section 49, and thereafter the brake will remain released until the primary control lever 44 is moved or until the crank 51 is rotated in reverse direction.

This auxiliary brake release system is of special utility when a row of carts are disposed in nested positions. The brakes of all the carts may be released by exerting finger pressure against the levers 51 which are, of course, disposed outwardly and in convenient position as distinguished from the then inaccessible position of the levers 44. When it is desired to move the nested carts, any brakes that may have been left engaged to prevent undesirable movement of the stack of carts may be readily released.

Where both primary and auxiliary mechanical systems are provided for the release or control of the brakes, it is believed that better cart control can be experienced. In automatic release systems where the brakes are released when a plurality of carts are nested, there is less control of the forwardly positioned carts of a nested row. On-site usage has shown an advantage where the brakes of the foremost or any intermediate cart can be left applied to better control the stacking or retention of the carts.

Figure 7:
FIG. 7 is a cross-sectional partial elevation taken along the line 7—7 of FIG. 1.

The brake system described is in general adaptable for use on shopping carts of varied design, since the control rod 31 may be provided in different bend patterns for convenient application and usage. The control rod can be mounted on the main frame supports of many different styles and makes of shopping carts without disturbing the nesting characteristics of such carts. In the present installation a guide bracket 53 is welded to the basket 13 as shown in FIG. 7 to protect and guide the control rod. Similar guide elements may be used on other cart designs. On some shopping carts a second pivotally mounted rocker arm or other linkage mechanism may be necessary to transmit the brake control forces to the brake when the mounting wheels for the cart are in less favorable position.

While a single embodiment of the invention has been shown and described, it should be apparent that the invention is adaptable to various modifications and changes.

We claim:

1. A brake attachment for nesting type shopping carts having a frame and basket and an operator push handle for guiding said cart as the cart is moved about on supporting wheels comprising a brake element mounted on said cart in position adjacent one of the support wheels of said cart, a resilient member for normally urging said brake toward frictional contact with said wheel, an operator control lever positioned adjacent to the operator push handle of said cart for convenient manipulation by the cart user, a linkage system interconnecting said brake element and operator lever whereby manipulation of the lever is effective to selectively release and partially release said brake, and a lock mechanism for said linkage system inclusive of a release lock and a catch element for engagement with said release lock to selectively hold said brake in disengaged position, said lock mechanism being automatically movable to the disengaged at-rest position whenever the operator handle is moved toward the brake release position.

2. Structure as set forth in claim 1 wherein an element of the said lock mechanism moves under influence of gravity forces to the at-rest disengaged position.

3. Structure as set forth in claim 1 wherein the release lock and catch are held in engagement by the forces exerted by said resilient member.

4. Structure as set forth in claim 1 wherein a primary brake control is provided by the operator lever and the linkage system, and further comprising an auxiliary brake control disposed away from said operator lever for releasing said brake whereby said brake element can be released by manipulation of said operator lever or by said auxiliary brake control.

5. Structure as set forth in claim 4 wherein the lock mechanism additionally provides said auxiliary brake control.

6. Structure as set forth in claim 1 and further comprising a rocker arm in said linkage system and a cam surface on said rocker arm in position adjacent said catch element for engagement by said release lock to provide an auxiliary brake control whereby the brakes may be selectively released by manipulation of said operator lever or by said release lock acting additionally as an auxiliary brake control.

References Cited

UNITED STATES PATENTS

| | | | |
|---|---|---|---|
| 1,784,976 | 12/1930 | Schnabel | 188—20 |
| 3,095,211 | 6/1963 | Altherr | 280—33.99 |

FERGUS S. MIDDLETON, Primary Examiner

THOMAS W. BUCKMAN, Assistant Examiner

U.S. Cl. X.R.

280—33.99